(12) United States Patent
Dai

(10) Patent No.: US 9,362,568 B2
(45) Date of Patent: Jun. 7, 2016

(54) BATTERY WITH HYBRID ELECTROCATALYSTS

(71) Applicant: The Board of Trustees of the Leland Stanford Junior University, Palo Alto, CA (US)

(72) Inventor: Hongjie Dai, Cupertino, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 127 days.

(21) Appl. No.: 14/336,854

(22) Filed: Jul. 21, 2014

(65) Prior Publication Data

US 2014/0333264 A1 Nov. 13, 2014

Related U.S. Application Data

(63) Continuation-in-part of application No. 13/768,810, filed on Feb. 15, 2013, now Pat. No. 9,237,658, and a continuation-in-part of application No. 13/401,655, filed on Feb. 21, 2012, now Pat. No. 9,236,197.

(Continued)

(51) Int. Cl.
*H01M 12/06* (2006.01)
*H01M 12/08* (2006.01)
(Continued)

(52) U.S. Cl.
CPC ............ *H01M 4/9083* (2013.01); *B82Y 30/00* (2013.01); *B82Y 40/00* (2013.01); *H01B 1/122* (2013.01);
(Continued)

(58) Field of Classification Search
CPC .... H01M 4/131; H01M 4/9016; H01M 12/06; H01M 12/08
USPC ....................................... 429/224, 218.1, 406
See application file for complete search history.

(56) References Cited

U.S. PATENT DOCUMENTS 6,413,792 B1   7/2002   Sauer et al.
7,001,792 B2   2/2006   Sauer et al.
(Continued)

FOREIGN PATENT DOCUMENTS

WO          2007041692 A2      4/2007

OTHER PUBLICATIONS

Fu et al. Beaded Cobalt Oxide Nanoparticles along Carbon Nanotubes: Towards More Highly Integrated Electronic Devices. Adv. Mater., vol. 17, No. 2, 2005, pp. 217-221 [online], [retrieved Dec. 22, 2015]. Retrieved from the Internet <URL: http://onlinelibrary.wiley.com/doi/10.1002/adma.200400833/epdf>.*

(Continued)

*Primary Examiner* — Basia Ridley
*Assistant Examiner* — James Erwin
(74) *Attorney, Agent, or Firm* — Crawford Maunu PLLC

(57) ABSTRACT

Aspects of the present disclosure are directed to electrodes and implementations such as batteries. As may be implemented in accordance with one or more embodiments, an apparatus includes a nanocarbon substrate having at least one of graphene and carbon nanotubes, and a hybrid electrode including a cobalt oxide/carbon nanotube (CoO/CNT) catalyst and a Ni—Fe-layered double hydride (LDH) catalyst. The catalysts and substrate facilitate transfer of charge carriers. Various aspects are directed to a battery type device having an anode and a single or split cathode with the respective catalysts on the cathode to facilitate oxygen reduction and oxygen evolution reactions for discharging and charging the battery type device.

20 Claims, 3 Drawing Sheets

Related U.S. Application Data

(60) Provisional application No. 61/856,326, filed on Jul. 19, 2013, provisional application No. 61/600,400, filed on Feb. 17, 2012, provisional application No. 61/761,401, filed on Feb. 6, 2013, provisional application No. 61/444,480, filed on Feb. 18, 2011, provisional application No. 61/444,468, filed on Feb. 18, 2011.

(51) Int. Cl.

| | |
|---|---|
| *H01M 4/90* | (2006.01) |
| *H01M 12/00* | (2006.01) |
| *B82Y 30/00* | (2011.01) |
| *B82Y 40/00* | (2011.01) |
| *H01G 11/36* | (2013.01) |
| *H01B 1/12* | (2006.01) |
| *H01M 4/131* | (2010.01) |

(52) U.S. Cl.
CPC .............. *H01G 11/36* (2013.01); *H01M 4/9016* (2013.01); *H01M 12/005* (2013.01); *H01M 12/08* (2013.01); *H01M 4/131* (2013.01); *H01M 12/06* (2013.01); *Y02E 60/13* (2013.01); *Y10S 977/734* (2013.01); *Y10S 977/748* (2013.01); *Y10S 977/847* (2013.01); *Y10S 977/932* (2013.01)

(56) References Cited

U.S. PATENT DOCUMENTS

| | | | |
|---|---|---|---|
| 8,864,969 | B2 | 10/2014 | Liu et al. |
| 2003/0211502 | A1 | 11/2003 | Sauer et al. |
| 2004/0149568 | A1 | 8/2004 | Huang et al. |
| 2005/0202444 | A1 | 9/2005 | Zhu |
| 2006/0154399 | A1 | 7/2006 | Sauer et al. |
| 2007/0159156 | A1 | 7/2007 | Hu et al. |
| 2007/0238112 | A1 | 10/2007 | Sohn et al. |
| 2008/0119366 | A1 | 5/2008 | Sauer et al. |
| 2008/0187915 | A1 | 8/2008 | Polonsky et al. |
| 2010/0096268 | A1 | 4/2010 | Ling et al. |
| 2013/0189580 | A1 | 7/2013 | Dai et al. |

OTHER PUBLICATIONS

Han et al. Preparation of Ni2+—Fe3+ Layered Double Hydroxide Material with High Crystallinity and Well-Defined Hexagonal Shapes. Chem. Mater., vol. 20, 2008, pp. 360-363 [online], [retrieved Dec. 22, 2015]. Retrieved from the Internet <URL: http://pubs.acs.org/doi/pdf/10.1021/cm7023789>.*

Chen, Z., Choi, J. Y., Wang, H. J., Li, H. & Chen, Z. W. Highly durable and active non-precious air cathode catalyst for zinc air battery. J. Power Sources 196, 3673-3677 (2011).

Feng, J. et al. Engineering manganese oxide/nanocarbon hybrid materials for oxygen reduction electrocatalysis. Nano Res. 5, 718-725 (2012). Abstract Only.

Liang, Y. Y. et al. Covalent hybrid of spinel manganese—cobalt oxide and graphene as advanced oxygen reduction electrocatalysts. J. Am. Chem. Soc. 134, 3517-3523 (2012).

Chen, Z. et al. Highly active and durable core-corona structured bifunctional catalyst for rechargeable metal-air battery application. Nano Lett. 12, 1946-1952 (2012).

Chen, Z. et al. Manganese dioxide nanotube and nitrogen-doped carbon nanotube based composite bifunctional catalyst for rechargeable zinc-air battery. Electrochim. Acta 69, 295-300 (2012).

Liang, Y. Y. et al. Oxygen reduction electrocatalyst based on strongly coupled cobalt oxide nanocrystals and carbon nanotubes. J. Am. Chem. Soc. 134, 15849-15857 (2012).

Wang, et al., "An ultrafast nickel—iron battery from strongly coupled inorganic nanoparticle / nanocarbon hybrid materials," Nature Communications, Jun. 26, 2012

Wang, H. L. & Dai, H. J. Strongly coupled inorganic-nano-carbon hybrid materials for energy storage. Chem. Soc. Rev. 42, 3088-3113 (2013).

Liang, Y. Y., Li, Y. G., Wang, H. L. & Dai, H. J. Strongly coupled inorganic/ nanocarbon hybrid materials for advanced electrocatalysis. J. Am. Chem. Soc. 135, 2013-2036 (2013).

Wang, Hailiang, et al. "LiMn1—xFexPO4 Nanorods Grown on Graphene Sheets for Ultrahigh—Rate—Performance Lithium Ion Batteries." Angewandte Chemie 123.32 (2011): 7502-7506.

P. Bergveld, "A critical evaluation of direct electrical protein detection methods," Biosensors and Bioelectronics; 6 (1):55-72 (1991).

J. J. Kasianowicz, E. Brandin, D. Branton, and D. W. Deamer, "Characterization of individual polynucleotide molecules using a membrane channel," Proc. Natl. Acad. Sci., vol. 93, No. 24, pp. 13770-13773 (1996).

Jung-Suk Goo, Chang-Hoon Choi, F. Danneville, E. Morifuji, H.S. Momose, Yu Zhiping, H. Iwai, T.H. Lee, and R.W. Dutton, "An accurate and efficient high frequency noise simulation technique for deep submicron MOSFETs", IEEE Trans. on Electron Devices, vol. 47, No. 12, Dec. 2000, pp. 2410-2419 (2000).

Meller, L. Nivon, and D. Branton, "Voltage-driven DNA translocations through a nanopore," Physical Review Letters, vol. 86, No. 15, pp. 3435-3438 (2001).

G. De Geronimo, P. O'Connor, V. Radeka, B. Yu, "Front-end electronics for imaging detectors", Nuclear Instruments and Methods in Physics Research A 471 192-199 (2001).

S. Ingebrandt, Characterization of the cell-transistor coupling, dissertation thesis, Johannes Gutenberg University Mainz, Germany (2001).

M. Shim, N. Wong Shi Kam, R. Chen, Y. Li, and H. Dai, "Functionalization of Carbon Nanotubes for Biocompatibility and Biomolecular Recognition," American Chemical Society, Nano Letters, Jan. 21, 2002.

M. J. Schoning and A. Poghossian, "Recent advances in biologically sensitive field-effect transistors (BioFETs)," Analyst, vol. 127, pp. 1137-1151 (2002).

A.J. Storm, J. Chen, X. Ling, and D.C. Zandbergen, "Fabrication of solid-state nanopores with single-nanometer precision," Nature Mater.; 2(8):537-540 (2003).

J. Hahm and C. M. Lieber, "Direct ultrasensitive electrical detection of DNA and DNA sequence variations using nanowire nanosensors," Nano Letters, vol. 4, No. 1, pp. 51-54 (2004).

Z. Li et al., "Sequence specific label-free DNA sensors based on silicon nanowires," Nano Letters, vol. 4, pp. 245-247 (2004).

M. C. Cheng et al., "Nanotechnologies for biomolecular detection and medical diagnostics," Current Opinion in Chemical Biology, vol. 10, pp. 11-19 (2006).

A.Talasaz, M. Nemat-Gorgani, Y. Liu, P. Stahl, R.W. Dutton, M. Ronaghi, and R.W. Davis, "Prediction of protein orientation upon immobilization on biological and nonbiological surfaces," Proc Natl Acad Sci, 103(40):14773-8 (2006).

E. Stern et al., "Label-free immunodetection with CMOS-compatible semiconducting nanowires," Nature, vol. 445, pp. 519-522 (2007).

Y. Liu et al, "Effect of Electrodiffusion Current Flow on Electrostatic Screening in Aqueous Pores," J. Appl. Phys. 103, pp. 084701-1-084703 (2008).

Y. Liu, K. Lilja, C. Heitzinger, and R. Dutton, "Overcoming the Screening-Induced Performance Limits of Nanowire Biosensors: A Simulation Study on the Effect of Electro-Diffusion Flow," Electron Devices Meeting, IEDM 2008, IEEE International, pp. 1-4 (2008).

P. R. Nair and M. A. Alam, "Screening-limited response of nanobiosensors," Nano Letters, vol. 8, No. 5, pp. 1281-1285 (2008).

S.J. Kim, S.H. Ko, K. H. Kang and J. Han, "Direct seawater desalination by ion concentration polarization," Nature Nanotechnology, vol. 5, pp. 297-301 (Apr. 2010).

Y. Liu, D. Huber, and R Dutton, "Limiting and overlimiting conductance in field-effect gated nanopores," Appl. Phys. Lett. 96, 253108 (2010).

F. Danneville, H. Happy, G. Dambrine, J.-M. Belquin, A. Cappy, "Microscopic noise modeling and macroscopic noise models: how good a conection?", IEEE Trans. on Electron Devices, vol. 41, No. 5, pp. 779-786 (May 1994) (Abstract Only).

(56) References Cited

OTHER PUBLICATIONS

W. Huang, S. Taylor, K. Fu, Y. Lin, D. Zhang, T. Hanks, A. Rao, and Y. Sun, "Attaching Proteins to Carbon Nanotubes via Diimide-Activated Amidation," American Chemical Society, Nano Letters, Mar. 16, 2002, 2 (4), pp. 311-314.

E. Souteyrand, J.P. Cloarec, J.R. Martin, C. Wilson, I. Lawrence, S. Mikkelsen, and M.F. Laurence, "Direct detection of the hybridization of synthetic homo-oligomer DNA sequences by field effect," J. Phys. Chem. B, vol. 101, pp. 2980-2985 (1997).

J. Li, D. Stein, C. McMullan, D. Branton, M. Aziz, and J. Golovshenko, "Ion-beam sculpting at nanometer length scales," Nature, vol. 412(6843), pp. 166-169 (2001).

P. Bergveld, "Thirty years of ISFETOLOGY: what happened in the past 30 years and what may happen in the next 30 years," Sensors and Actuators B, vol. 88, pp. 1-20 (2003).

Wang, H.; Liang,Y.; Mirfakhrai,T.; Chen, Z.; Sanchez Casalongue, H. and Dai, H., "Advanced Asymmetrical Supercapacitors Based on Graphene Hybrid Materials." Nano Research 4(8), pp. 729-736 (Aug. 2011).

Liu, N.; Hu, L; McDowell, M. T.; Jackson, A. and Cui, Y., "Prelithiated Silicon Nanowires as an Anode for Lithium Ion Batteries." ACS, Nano 5(8), pp. 6487-6493 (Jun. 2011).

Padhi, A. K.; Nanjundaswamy, K. S. and Goodenough, J. B., "Phospho-olivines as Positive-Electrode Materials for Rechargeable Lithium Batteries." J. Electrochem. Soc. 144, pp. 1188-1194, (1997).

Kotz, R. and Carlen, M., "Principles and Applications of Electrochemical Capacitors." Electrochimica Acta, 45, pp. 2483-2498, (1999).

Whittingham, M. S., "Lithium Batteries and Cathode Materials." Chem. Rev. 104, pp. 4271-4301, (2004).

Winter, M. and Brodd, R. J., "What Are Batteries, Fuel Cells and Supercapacitors?" Chem. ReV. 104, pp. 4245-4269, (2004).

Novoselov, K.S.; Geim, A. K.; Morozov, S. V.; Jiang, D.; Zhang, Y.; Dubonos, V.; Grigorieva, I. V. and Firsov, A. A., "Electric Field Effect in Atomically Thin Carbon Films." Science 306, pp. 666-669, (2004).

Wang, Y.; Wang, Z. and Xia, Y., "An asymmetric supercapacitor using RuO2/TiO2 nanotube composite and activated carbon electrodes." Electrochim. Acta, 50, pp. 5641-5646, (2005). Abstract Only.

Yin, Y. and Alivisatos, A. P., "Nanoscale Materials" Nature 437, pp. 664-670, (2005).

Li, X.; Wang, X.; Zhang, L.; Lee, S. and Dai, H., "Chemically Derived, Ultrasmooth Graphene Nanoribbon Semiconductors." Science, 319, pp. 1229-1232, (2008).

Simon, P. and Gogotsi, Y., "Materials for Electrochemical Capacitors." Nat. Mater., 7, pp. 845-854, (2008).

Bruce, P. G.; Scrosati, B. and Tarascon, J., "Nanomaterials for Rechargeable Lithium Batteries." Angew. Chem. Int. Ed. 47, pp. 2930-2946, (2008).

Wang, Y.; Wang, Y.; Hosono, E.; Wang, K. and Zhou, H., "The Design of a LiFePO4/Carbon Nanocomposite With a Core-Shell Structure and Its Synthesis by an In Situ Polymerization Restriction Method." Angew. Chem. Int. Ed. 47, pp. 7461-7465, (2008).

Wang, L; Zhou, F. and Ceder, G., "Ab Initio Study of the Surface Properties and Nanoscale Effects of LiMnPO4." Electrochem. Solid State Lett. 11, A94-A96, (2008).

Zaghib, K.; Mauger, A.; Fendron, F.; Massot, M. and Julien, C. M., "Insertion Properties of LiFe0.5Mn0.5PO4 Electrode Materials for Li-ion Batteries." Ionics 14, pp. 371-376, (2008).

Sun, X.; Liu, Z.; Welsher, K.; Robinson, J. T.; Goodwin, A.; Zaric, S. and Dai, H., "Nano-Graphene Oxide for Cellular Imaging and Drug Deliver." Nano Res., 1(3), pp. 203-212, (2008).

Guo, Y.; Hu, J. and Wan, L., "Nanostructured Materials for Electrochemical Energy Conversion and Storage Devices." Adv. Mater., 20, pp. 2878-2887, (2008).

Li,Y.; Tan, B. and Wu, Y., "Exploring Nanowire Arrays and Graphene Hybrid Materials for Lithium Battery." Nano Lett., 8, pp. 265-270, (2008).

Stoller, M. D.; Park, S.; Zhu, Y.; An, J. and Ruoff, R. S., "Graphene-Based Ultracapacitors." Nano Letters, vol. 8, No. 10, pp. 3498-3502, (2008).

Armand, M. and Tarascon, J., "Building Better Batteries." Nature, vol. 451, pp. 652-657, (2008).

Wang, H.; Wang, X.; Li, X. and Dai, H., "Chemical Self-Assembly of Graphene Sheets." Nano Res. vol. 2, pp. 336-342, (2009).

Mkhoyan, K. A.; Contryman, A. W.; Silcox, J.; Stewart, D. A.; Eda, G.; Mattevi, C.; Miller, S. and Chhowalla, M., "Atomic and Electronic Structure of Graphene-Oxide." Nano Lett 9, pp. 1058-1063, (2009).

Wang, Y.; Shi, Z.; Huang, Y.; Ma, Y.; Wang, C.; Chen, M. and Chen, Y., "Supercapacitor Devices Based on Graphene Materials." J. Phys. Chem. C, 113, pp. 13103-13107, (2009).

Meduri, P.; Pendyala, C.; Kumar, V.; Sumanasekera, G. U. and Sunkara, M. K., "Hybrid Tin Oxide Nanowires as Stable and High Capacity Anodes for Li-Ion Batteries." Nano Lett., 9, pp. 612-616, (2009).

Ko, J. M. and Kim, K. M., "Electrochemical Properties of MnO2/Activated Carbon Nanotube Composite as an Electrode Material for Supercapacitor." Materials Chemistry and Physics, 114, pp. 837-841, (2009).

Murugan, A. V.; Muraliganth, T.; Ferreira, P. J and Manthiram, A., "Dimensionally Modulated, Single-Crystalline LiMPO4 (M=Mn, Fe, Co, and Ni) with Nano-Thumblike Shapes for High-Power Energy Storage." Inorg. Chem. 48, pp. 946-952, (2009).

Kang, B. and Ceder, G., "Battery Materials for Ultrafast Charging and Discharging." Nature, 458, pp. 190-193, (2009).

Martha, S. K.; Markovsky, B.; Grinblat, J.; Gofer, Y.; Haik, O.; Zinigrad, E.; Aurbach, D.; Drezen, T.; Wang, D.; Deghenghi, G. and Exnar, I., "LiMnPO4 as an Advanced Cathode Material for Rechargeable Lithium Batteries." J. Electrochem. Soc. 156, A541-A552, (2009).

Park, S. and Ruoff, R. S., "Chemical Methods for the Production of Graphenes." Nature Nanotechnol. 4, pp. 217-224, (2009).

Yang, X.; Zhang, X.; Ma, Y.; Huang, Y.; Wang, Y. and Chen, Y., "Superparamagnetic Graphene Oxide—Fe3O4 Nanoparticles Hybrid for Controlled Targeted Drug Carriers." J. Mater. Chem, 19, pp. 2710-2714, (2009).

Kong, L.; Lang, J.; Liu, M.; Luo, Y. and Kang, L., "Facile Approach to Prepare Loose-Packed Cobalt Hydroxide Nano-Flakes Materials for Electrochemical Camacitors." J. Power Sources, 194, pp. 1194-1201, (2009).

Lang, J.; Kong, L.; Wu, W.; Liu, M. and Luo,Y., "A Facile Approach to the Preparation of Loose-Packed Ni(OH)2 Nanoflake Materials for Electrochemical Capacitors." J. Solid State Electrochem., 13, pp. 333-340, (2009).

Wang, D.; Choi, D.; Li, J.; Yang, Z.; Nie, Z.; Kou, R.; Hu, D.; Wang, C.; Saraf, L. V.; Zhang, J.; Aksay, I. A. and Liu, J., "Self-Assembled TiO2-Graphene Hybrid Nanostructures for Enhanced Li-Ion Insertion." ACS Nano, 3, pp. 907-914, (2009).

Lim, B.; Jiang, M.; Camargo, P. H. C.; Cho, E.C.; Tao, J.; Lu, X; Zhu, Y. and Xia,Y., "Pd-Pt Bimetallic Nanodendrites with High Activity for Oxygen Reduction." Science 324, pp. 1302-1305, (2009).

Ji, X.; Lee, K. T. and Nazar, L. F., "A Highly Ordered Nanostructured Carbon-Sulphur Cathode for Lithium-Sulphur Batteries." Nat. Mater., 8, pp. 500-506, (2009).

Cui, L.; Ruffo, R.; Chan, C. K.; Peng, H. and Cui, Y., "Crystalline-Amorphous Core-Shell Silicon Nanowires for High Capacity and High Current Battery Electrodes." Nano Lett., 9, pp. 491-495, (2009).

Lang, J.; Kong, L.; Liu, M.; Luo, Y. and Kang, L., "Asymmetric Supercapacitors Based on Stabilized ~-Ni(OH)2 and Activated Carbon." J. Solid State Electrochem., 14, pp. 1533-1539, (2010).

Ellis, B. L.; Lee, K. T. and Nazar, L. F., "Positive Electrode Materials for Li-Ion and Li-Batteries." Chem. Mater. 22, pp. 691-714, (2010).

Bakenov, Z. and Taniguchi, I., "Physical and Electrochemical Properties of LiMnPO4/C Composite Cathode Prepared with Different Conductive Carbons." J. Power Sources 195, pp. 7445-7451, (2010).

Kang, B. and Cedar, G., "Electrochemical Performance of LiMnPO4 Synthesized with Off-Stoichiometry." J. Electrochem. Soc. 157, pp. A808-A811, (2010).

Wang, H.; Robinson, J. T.; Diankov, G. and Dai, H., "Nanocrystal Growth on Grahene with Various Degrees of Oxidation." J. Am. Chem. Soc. 132, pp. 3270-3271, (2010).

(56) References Cited

OTHER PUBLICATIONS

Liang, Y.; Wang, H.; Casalongue, H. S.; Chen, Z. and Dai, H., "TiO2 Nanocrystals Grown on Graphene as Advanced Photocatalytic Hybrid Materials." Nano Res. 3, pp. 701-705, (2010).

Wang, H.; Sanchez Casalongue, H.; Liang, Y. and Dai, H., "Ni(OH)2 Nanoplates Grown on Graphene as Advanced Electrochemical Pseudocapacitor Materials." J. Am. Chem. Soc. 132, pp. 7472-7477, (2010).

Wang, H.; Cui, L; Yang, Y.; Casalongue, H. S.; Robinson, J. T.; Liang, Y.; Cui, Y. and Dai, H., "Mn3O4—Graphene Hybrid as a High-Capacity Anode Material for Lithium Ion Batteries." J. Am. Chem. Soc. 132, pp. 13978-13980, (2010).

Yang, S.; Cui, G.; Pang, S.; Cao, Q.; Kolb, U.; Feng, X.; Maier, J. and Mullen, K., "Fabrication of Cobalt and Cobalt Oxide/Graphene Composties: Towards High-Performance Anode Materials for Lithium Ion Batteries." ChemSusChem 3, pp. 236-239, (2010).

Ye, J.; Zhang, H.; Yang, R.; Li, X. and Qi, L., "Morphology-Controlled Synthesis of SnO2 Nanotubes by Using 1D Silica Mesostructures as Sacrificial Templates and Their Application in Lithium-Ion Batteries." Small 6, pp. 296-306, (2010).

Ban, C.; Wu, Z.; Gillaspie, D. T.; Chen, L.; Yan, Y.; Blackburn, J. L. and Dillon, A. C., "Nanostructured Fe3O4/SWNT Electrode: Binder-Free and High-Rate Li-Ion Anode." AdV. Mater., 22, pp. E145-E149, (2010).

Wu, Z.; Ren, W.; Wen, L.; Gao, L.; Zhao, J.; Chen, Z.; Zhou, G.; Li, F. and Cheng, H., "Graphene Anchored with Co3O4 Nanoparticles as Anode of Lithium Ion Batteries with Enhanced Reversible Capacity and Cyclic Performance." ACS Nano, 4, pp. 3187-3194, (2010).

Zhou, G.; Wang, D.; Li, F.; Zhang, L.; Li, N.; Wu, Z.; Wen, L.; Lu, G. Q. and Cheng, H., "Graphene-Wrapped Fe3O4 Anode Material with Improved Reversible Capacity and Cyclic Stability for Lithium Ion Batteries." Chem. Mater., 22, pp. 5306-5313, (2010).

Eda, G.; Lin, Y.; Mattevi, C.; Yamaguchi, H.; Chen, H.; Chen, I.; Chen, C. and Chhowalla, M., "Blue Photoluminescence from Chemically Derived Graphene Oxide." AdV. Mater. 22, pp. 505-509, (2010).

Wu, Z.; Ren, W.; Wang, D.; Li, F.; Liu, B. and Cheng, H., "High-Energy MnO2 Nanowire/Graphene and Graphene Asymmetric Electrochemical Capacitors." ACS Nano, 4, pp. 5835-5842, (2010).

An, X.; Simmons, T.; Shah, R.; Wolfe, C.; Lewis, K. M.; Washington, M.; Nayak, S.; Talapatra, S. and Kar, S., "Stable Aqueous Dispersions of Noncovalently Functionalized Graphene from Graphite and their Multifunctional High-Performance Applications." Nano Lett., 10, pp. 4295-4301, (2010).

Wu, Z.; Wang, D.; Ren, W.; Zhao, J.; Zhou, G.; Li, F. and Cheng, H., "Anchoring Hydrous RuO2 on Graphene Sheets for High-Performance Electrochemical Capacitors." Adv. Funct. Mater., 20, pp. 3595-3602, (2010).

Chen, P.; Chen, H.; Qiu, J. and Zhou, C., "Inkjet Printing of Single-Walled Carbon Nanotube/RuO2 Nanowire Supercapacitors on Cloth Fabrics and Flexible Substrates." Nano Res., 3, pp. 594-603, (2010).

Ji, X. and Nazar, L. F., "Advances in Li—S Batteries." J. Mater. Chem. 20, pp. 9821-9826, (2010).

Yang, Y.; McDowell, M. T.; Jackson, A.; Cha, J. J.; Hong, S. S. and Cui, Y., "New Nanostructured Li2S/Silicon Rechargeable Battery with High Specific Energy." Nano Lett., 10, pp. 1486-1491, (2010).

Kim, H.; Kim, S.; Park, Y.; Gwon, H.; Seo, D.; Kim, Y. and Kang, K., "SnO2/Graphene Composite with High Lithium Storage Capability for Lithium Rechargeable Batteries." Nano Res., 3, pp. 813-821, (2010).

Hailang Wang, et al., "Graphene-Wrapped Sulfur Particles as a Rechargeable Lithium—Sulfer Battery Cathode Material with High Capacity and Cycling Stability," Nano Lett., 11, pp. 2644-2647 (2011).

Hailang Wang, et al., "Co1-xS-Graphene Hybrid: A High-Performance Metal Chalcogenide Electrocatalyst for Oxygen Reduction," Angew. Chem. Int. Ed. 50, pp. 10969-10972 (2011).

Yanguang Li, et al., "MoS2 Nanoparticles Grown on Graphene: An Advanced Catalyst for the Hydrogen Evolution Reaction," J. Am. Chem. Soc. 133, pp. 7296-7299 (2011).

Yongye Liang, et al., Covalent Hybrid of Spinel Manganese—Cobalt Oxide and Graphene as Advanced Oxygen Reduction Electrocatalysts, J. Am. Chem. Soc., pp. 1-8 (2012).

Corrigan, D. A. & Knight, S. L. Electrochemical and spectroscopic evidence on the participation of quadrivalent nickel in the nickel—hydroxide redox reaction. J. Electrochem. Soc. 136, 613-619 (1989). Abstract Only.

Kinoshita, K. Electrochemical Oxygen Technology (Wiley-Interscience, New York, 1992). Book Description Only.

Wang, J. M., Zhang, L., Zhang, C. & Zhang, J. Q. Effects of bismuth ion and tetrabutylammonium bromide on the dendritic growth of zinc in alkaline zincate solutions. J. Power Sources 102, 139-143 (2001). Abstract Only.

Linden, D. & Reddy, T. B. Handbooks of Batteries (McGraw-Hill, New York, 2002).

Arico, A. S., Bruce, P., Scrosati, B., Tarascon, J. M. & Van Schalkwijk, W. Nanostructured materials for advanced energy conversion and storage devices. Nat. Mater. 4, 366-377 (2005).

Smedley, S. & Zhang, X. G. A zinc-air fuel cell. ECS Trans. 3, 101-114 (2007). Abstract Only.

Sapkota, P. & Kim, H. Zinc-air fuel cell, a potential candidate for alternative energy. J. Ind. Eng. Chem. 15, 445-450 (2009). Abstract Only.

Lee, J. S. et al. Metal-air batteries with high energy density: Li-air versus Zn-air. Adv. Energy Mater. 1, 34-50 (2010).

Toussaint, G., Stevens, P., Akrour, L., Rouget, R. & Fourgeot, F. Development of a rechargeable zinc-air battery. ECS Trans. 28, 25-34 (2010). Abstract Only.

Girishkumar, G., McCloskey, B., Luntz, A. C., Swanson, S. & Wilcke, W. Lithium-air battery: promise and challenges. J. Phys. Chem. Lett. 1, 2193-2203 (2010). Abstract Only.

Scrosati, B., Hassoun, J. & Sun, Y.-K. Lithium-ion batteries. A look into the future. Energy Environ. Sci. 4, 3287-3295 (2011). Abstract Only.

Liang, Y. Y. et al. Co3O4 nanocrystals on graphene as a synergistic catalyst for oxygen reduction reaction. Nat. Mater. 10, 780-786 (2011).

Lee, J. S., Lee, T., Song, H. K., Cho, J. & Kim, B. S. Ionic liquid modified graphene nanosheets anchoring manganese oxide nano articles as efficient electrocatalysts for Zn-air batteries. Energy Environ. Sci. 4, 4148-4154 (2011).

Lee, J. S. et al. Ketjenblack carbon supported amorphous manganese oxides nanowires as highly efficient electrocatalyst for oxygen reduction reaction in alkaline solutions. Nano Lett. 11, 5362-5366 (2011).

Zhu, S. M. et al. Nitrogen-doped carbon nanotubes as air cathode catalysts in zinc-air battery. Electrochim. Acta 56, 5080-5084 (2011).

* cited by examiner

BATTERY WITH HYBRID ELECTROCATALYSTS

FEDERALLY-SPONSORED RESEARCH AND DEVELOPMENT

This invention was made with Government support under contract N00014-08-1-0860 awarded by the Office of Naval Research. The Government has certain rights in this invention.

FIELD

Aspects of various embodiments are directed to electrocatalysts, and their implementation with batteries.

BACKGROUND

Nanocarbon materials such as graphene and carbon nanotubes (CNTs) have been useful for a variety of applications, such as battery applications. However, these materials have been challenging to implement in certain applications. Moreover, while a variety of materials may be desirable to implement in various articles and electrical devices, the practical implementation of such materials has been limited. For example, various nanomaterials are expensive, do not perform as well as desired, or exhibit certain characteristics that also make the materials difficult to work with and/or manufacture while achieving desirable performance. As another example, a variety of batteries have been implemented to store energy for electrical grids and to propel vehicles, yet often do not provide desirable power output and energy capacity, can be expensive and may pose various safety and environmental challenges. For instance, the global shift of energy production from fossil fuels to renewable energy sources requires more efficient and reliable electrochemical energy storage devices for applications such as portable electronics, electrical vehicles and stationary grid storage. In particular, the development of electric or hydrogen-powered vehicles can be limited by the performance of batteries, supercapacitors and fuel cells.

SUMMARY

Various example embodiments are directed to electrocatalysts and their implementation, such as implementation with batteries.

According to an example embodiment, an apparatus includes a nanocarbon substrate having at least one of graphene and CNTs, and a hybrid electrode including a cobalt oxide/carbon nanotube (CoO/CNT) catalyst and a Ni—Fe-layered double hydride (LDH) catalyst. The catalysts and substrate facilitate transfer of charge carriers. Various aspects are directed to a battery type device having an anode and a single or split cathode with the respective catalysts on the cathode to facilitate oxygen reduction and oxygen evolution reactions (OERs) for discharging and charging the battery type device.

In accordance with another embodiment, a battery apparatus includes an anode, an electrolyte and first and second cathodes. The first cathode has a substrate and a hybrid CoO/CNT catalyst that operates with the anode and the electrolyte to facilitate an oxygen reduction reaction (ORR) for discharging stored energy (e.g., powering a load). The second cathode has a substrate and a hybrid Ni—Fe-LDH catalyst that operates with the anode and the electrolyte to facilitate an OER for storing energy (e.g., recharging the battery).

Other aspects are directed to a method for storing and discharging energy, such as for a battery. Energy is stored by facilitating an OER using a first cathode having a substrate and a hybrid Ni—Fe-LDH catalyst, in which charge carriers are passed between the first cathode and an anode via an electrolyte. The stored energy is discharged and a load is powered by facilitating an ORR using a second cathode having a substrate and a hybrid CoO/CNT catalyst, in which charge carriers are passed between the second cathode and the anode via an electrolyte. In some implementations, the second cathode is disconnected or otherwise electrically insulated from the anode while the energy is stored or charged.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
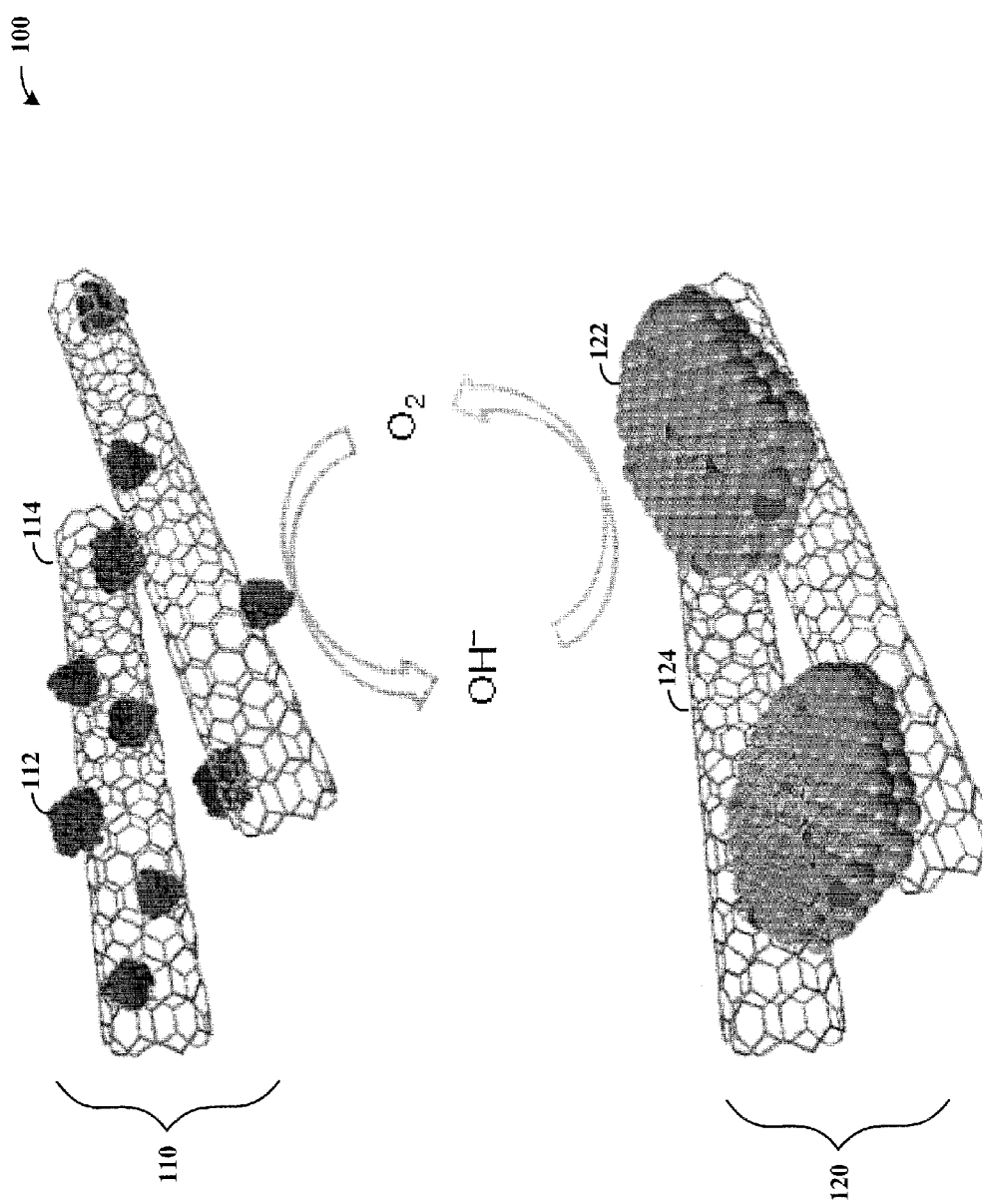
FIG. 1 shows respective electrode portions, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DESCRIPTION

Various example embodiments are directed to batteries based on hybrid electrocatalysts, apparatuses, systems and methods, such as those mentioned above.

In accordance with various embodiments of the instant disclosure, covalent bonding and/or strong coupling conditions are determined and used for covalently bonding inorganic particles with a nanocarbon structure such as graphene or a CNT, based upon a characteristic of the inorganic particles. The covalently-bonded inorganic particles and nanocarbon structure form a hybrid conductor, which is coupled in a circuit. Such an approach is amenable, for example, to fabricating one or more electrodes and/or apparatuses, such as may be implemented with a capacitive structure, battery or supercapacitor.

In connection with more particular embodiments, primary and rechargeable Zn-air batteries employ a CoO/CNT hybrid oxygen reduction catalyst and a Ni—Fe-LDH oxygen evolution catalyst cathode. These catalysts exhibit higher catalytic activity and durability in concentrated alkaline electrolytes than precious metal Pt and Ir catalysts. Certain such primary Zn-air batteries may be implemented with high discharge peak power density of about 265 mWcm$^{-2}$, current density of about 200 mAcm$^{-2}$ at 1V and an energy density greater than 700 Whkg$^{-1}$. In some embodiments, rechargeable Zn-air batteries are arranged in a tri-electrode configuration and exhibit small charge-discharge voltage polarization of about 0.70V at 20 mAcm$^{-2}$, high reversibility and stability over long charge and discharge cycles.

Various aspects of the present disclosure are also directed toward primary and rechargeable Zn-air batteries utilized as energy storage devices and having high energy and power density, high safety and economic viability. In certain embodiments, active and durable electrocatalysts are provided on the cathode side to catalyze an ORR during battery discharge, and for OER during charge for rechargeable batteries. In certain embodiments, the primary and rechargeable Zn-air batteries include a CoO/CNT hybrid oxygen reduction catalyst and Ni—Fe-LDH oxygen evolution catalyst for the cathode. The catalysts exhibit a higher catalytic activity and durability in concentrated alkaline electrolytes than precious metal Pt and Ir catalysts. As a result, in certain embodiments, a primary Zn-air battery has a high discharge peak power density (e.g., ~265 mWcm$^{-2}$; current density ~200 mAcm$^{-2}$ at 1V; and energy density 4700 Whkg$^{-1}$). Rechargeable Zn-air batteries in a tri-electrode configuration, in certain embodiments, exhibit a small charge discharge voltage polarization of ~0.70V at 20 mAcm$^{-2}$, high reversibility and stability over long charge and discharge cycles. Further, various aspects of the present disclosure are directed toward the combination of a CoO/CNT catalyst with the Ni—Fe LDH catalyst for use with respective electrodes. For instance, one or more embodiments are directed to the tri-electrode configuration in FIG. 5 of Appendix A in U.S. Provisional Patent Application Ser. No. 61/856,326, to which benefit is claimed and which is fully incorporated herein by reference.

In various embodiments, covalent bonding and/or strong coupling refers to the nature of interaction between inorganic nanoparticles and oxidized nanocarbon including graphene and CNTs in the hybrid, formed by nucleating and growing nanoparticles on oxidized carbon substrates.

Other aspects of the present disclosure are directed to an apparatus having a nanocarbon electrode including at least one of graphene and CNTs, and inorganic particles covalently-bonded to the nanocarbon electrode. The covalently-bonded electrode and/or inorganic particles form a hybrid conductor. The inorganic particles include at least one of nickel and iron, and are configured and arranged to facilitate the transfer of charge carriers with the nanocarbon electrode via the covalent bonds between the nanocarbon electrode and the inorganic particles. Such charge transfer is amenable to, for example, a Ni—Fe battery application.

Various aspects of the present disclosure are directed toward safe and affordable energy storage devices for portable electronics, electrical vehicles and stationary grid storage. With ample supply of oxygen from the atmosphere, metal-air batteries can have a higher theoretical energy density than traditional aqueous batteries and lithium-ion batteries. Primary Zn-air batteries can have a high theoretical energy density, about three times higher than the lithium-ion technology and can be used in medical and telecommunication applications, such as miniature hearing aids and wireless messaging devices. Various aspects of the present disclosure are directed toward primary and rechargeable Zn-air batteries using highly active and durable air electrocatalysts based on high-performance non-precious metal oxide or hydroxide for ORR and/or OER as may be used in affordable energy storage devices, medical and telecommunication applications.

Various aspects of the present disclosure are directed toward CoO and CoO/CNT hybrid material as an ORR electrocatalyst with higher activity than standard 20 wt % Pt on Vulcan® carbon black. Additionally, a Ni—Fe LDH and CNT hybrid material can be utilized as an OER electrocatalyst with activity and durability superior to 20 wt % Ir supported on Vulcan® carbon black. Carbon-free Ni—Fe LDH can be utilized as a highly OER-active phase in alkaline solutions even without the need of hybridizing with CNTs. The electrocatalytic performances of these catalysts can be attributed to phases of the inorganic nanoparticles, and the intimate bonding and electrical wiring to the underlying CNT networks which can improve the catalyst activity. Thus, in certain embodiments, the electrocatalysts are utilized for an air cathode for primary and rechargeable Zn-air batteries with significantly reduced ORR and OER overpotentials. These embodiments have a high discharge power density of ~265 mWcm$^{-2}$, and a large energy density of 4700 Whkg$^{-1}$. Moreover, in certain embodiments, the durability of catalysts, consistent with various aspects of the present disclosure, leads to advanced rechargeable Zn-air batteries with a long cycle life and high energy efficiency when operated in a tri-electrode configuration.

Another embodiment is directed to a battery having an anode and two cathode portions, with an electrolyte between the anode and cathode portions. The first one of the cathodes has a substrate and a CoO/CNT catalyst and operates with the anode and the electrolyte to facilitate an ORR for discharging stored energy. The second one of the cathodes has a substrate and a Ni—Fe-LDH catalyst that operates with the anode and the electrolyte to facilitate an OER for storing energy. The battery may, for example, be coupled to power a load connected between the first cathode and the anode, with a circuit path between the first cathode and the anode being disconnected or interrupted while the second cathode is operating to store energy (while the battery is being charged). The substrates may, for example, be carbon-based, and the electrolyte may include one or more similar or different electrolytes between anode and the respective cathodes.

Another embodiment is directed to an apparatus having a hybrid electrode operable with a substrate, such as a nanocarbon substrate that includes one or more of carbon paper, graphene and CNTs, which may include oxidized regions thereof. The hybrid electrode includes CoO/CNT and a Ni—Fe-LDH catalyst (e.g., with covalent bonding), and facilitates charge carrier transfer with the nanocarbon substrate. The discharging and charging may, for example, be carried out by catalyzing an ORR via the CoO/CNT catalyst during discharge of stored energy, and catalyzing an OER via the Ni—Fe-LDH during the storing of energy, such as may be implemented for battery operation. In addition, the catalysts may respectively be implemented as CoO nanocrystals on N-doped CNTs, and stacked Ni—Fe-LDH nanoplates having a thickness of about 10 atomic layers. In some implementations, the hybrid electrode includes graphene sheets with nanocrystals stacked in layers thereupon, which form an electrochemical pseudo-capacitor electrode. Further, a charge-passing separator material passes charge with the hybrid electrode, for respective charge and discharge functions.

In a more particular embodiment, the apparatus further includes an anode operable with the hybrid electrode acting as a cathode for a battery. The CoO/CNT catalyst is on a first cathode substrate and powers a load connected between the first cathode and anode, by catalyzing an ORR and discharging energy stored in the battery. The Ni—Fe-LDH catalyst is on a second cathode substrate and stores charge in the battery via a power source, connected between the second cathode substrate and the anode, by catalyzing an OER and storing energy in the battery. In some embodiments, the first and second cathode substrates are separated from one another and the anode is between the first and second cathode substrates in a tri-electrode type arrangement.

For information regarding details of other embodiments, experiments and applications that can be combined in varying degrees with the teachings herein, reference may be made to the teachings and underlying references provided in the above-referenced provisional patent application (including Appendices A and B therein), and in U.S. patent application Ser. No. 13/768,810 (U.S. Pat. No. 9,237,658) (and the underlying patent applications to which benefit is claimed therein), which are fully incorporated herein by reference. For instance, CoO/CNT and Ni—Fe-LDH catalysts and their application as described in these documents may be implemented herein, such as may be used with graphene and CNTs, and Zinc (Zn)-air electrodes as described.

Turning now to the figures, FIG. 1 shows an apparatus 100 with respective electrode portions 110 and 120, in accordance with one or more embodiments. Electrode portion 110 includes CoO nanocrystals 112 on CNTs 114 (e.g., n-doped CNTs), with the CoO nanocrystals operable as a catalyst that facilitates ORR. Electrode portion 120 includes Ni—Fe LDH nanoplates 122 on CNTs 124 (e.g., multi-walled CNTs), with the Ni—Fe LDH nanoplates operable as a catalyst that facilitates OER. As such, the respective electron portions employ strongly coupled inorganic/CNT hybrids for ORR and OER electrocatalysis with low overpotentials. In some implementations, the respective catalysts 112 and 122 on the electrode portions 110 and 120 are implemented together on a common electrode structure (such as the CNTs shown, other carbon-based electrodes such as graphene sheets or other nanocarbons, or other electrode material). Further, certain embodiments are directed to one or both of the electrode portions 110 and 120 being implemented separately.

The ORR and OER catalysts as show in FIG. 1 or characterized elsewhere herein may be manufactured in a variety of manners. In some implementations, transition metal salts and mildly oxidized multi-walled CNTs are dispersed in selected solvents. Controlled hydrolysis of metal precursors at a low temperature are used to selectively nucleate and grow metal oxide and hydroxide nanostructures on CNTs, which are further subjected to solvothermal reactions or gas-phase annealing in an ammonia environment at elevated temperatures to set phase, crystallinity of metal oxide or hydroxide and reduce oxidized CNTs with N-doping. Such approaches can be used to obtain uniform-sized CoO nanocrystals on N-doped CNTs (CoO/N-CNT) and Ni—Fe LDH ultrathin nanoplates (e.g., of about 10 atomic layers) on multi-walled CNTs (Ni—Fe LDH/CNT) with a nominal Ni:Fe=5, such as shown in FIG. 1.

In some embodiments (e.g., as may be implemented in experimental-type applications), primary Zn-air batteries are constructed using a CoO/N-CNT ORR electrocatalyst loaded on a carbon fiber paper electrode as an air cathode, which is paired with a Zn foil (e.g., in 6M KOH). Such an approach can be used to obtain a battery having an open circuit voltage of about 1.40 V, and which shows a high current density of about 200 mAcm$^{-2}$ at a voltage of 1.0 V and exhibits a peak power density of 265 mW cm$^{-2}$ at 0.70V. In certain implementations, the metal anode and electrolyte are replenished to regenerate the battery for subsequent operation/analysis, with the same CoO/N-CNT cathode.

Figure 2:
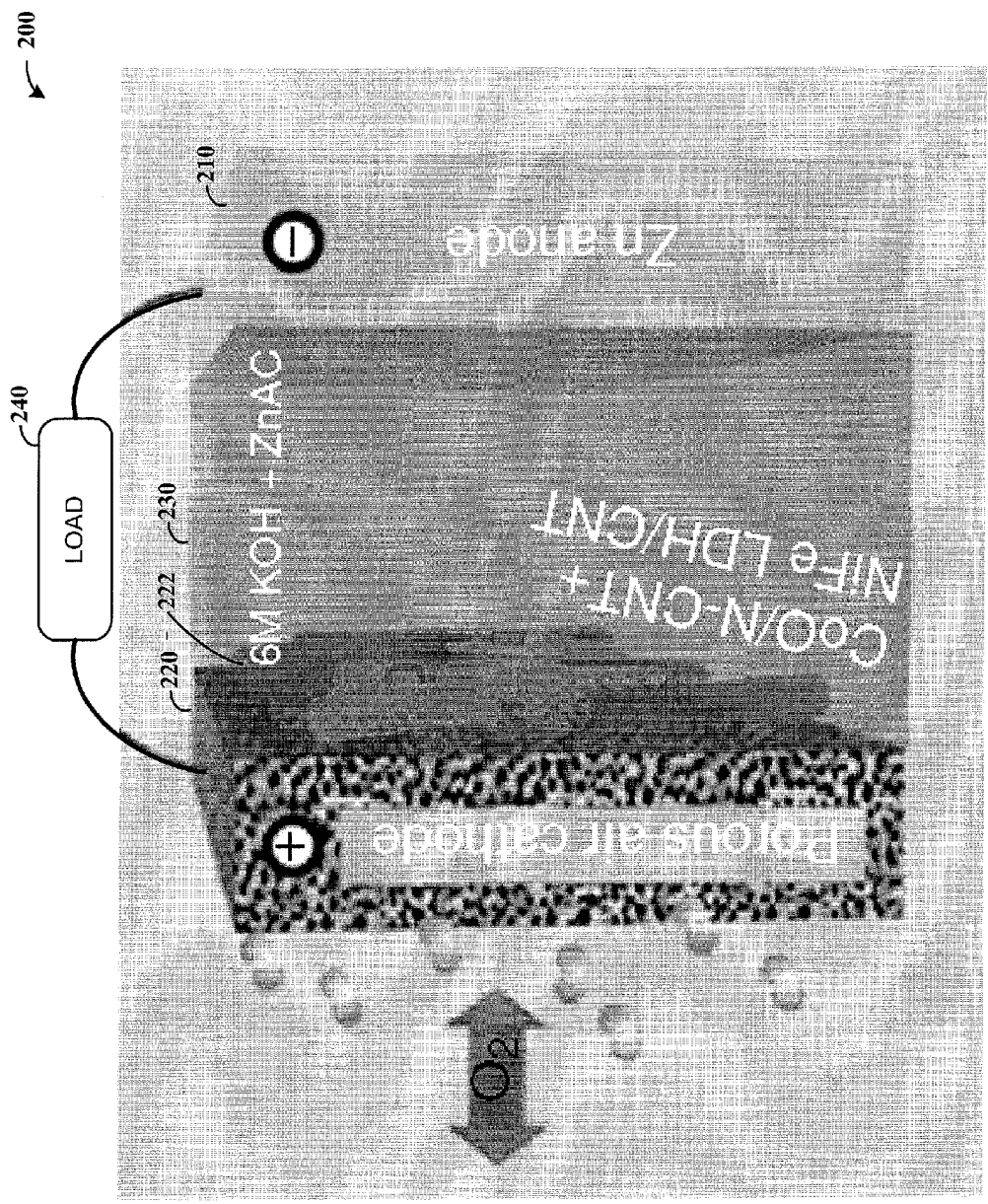
FIG. 2 shows a battery apparatus with an electrode having a hybrid catalyst, in accordance with another example embodiment.

FIG. 2 shows a battery apparatus 200 with an electrode having a hybrid catalyst, in accordance with another example embodiment. The battery apparatus 200 includes an anode 210 shown by way of example as including Zn, and a porous air cathode 220 with a hybrid catalyst material 222. An electrolyte 230 separates the anode 210 and porous air cathode 220, and is shown by way of example as including 6M KOH+ZnAC. The hybrid catalyst material 222 may, for example, include a combination of CoO/N-CNT and Ni—Fe LDH/CNT as air catalysts. A load 240 is coupled to draw power, with charge being discharged or stored via an oxygen reaction as shown.

Figure 3:
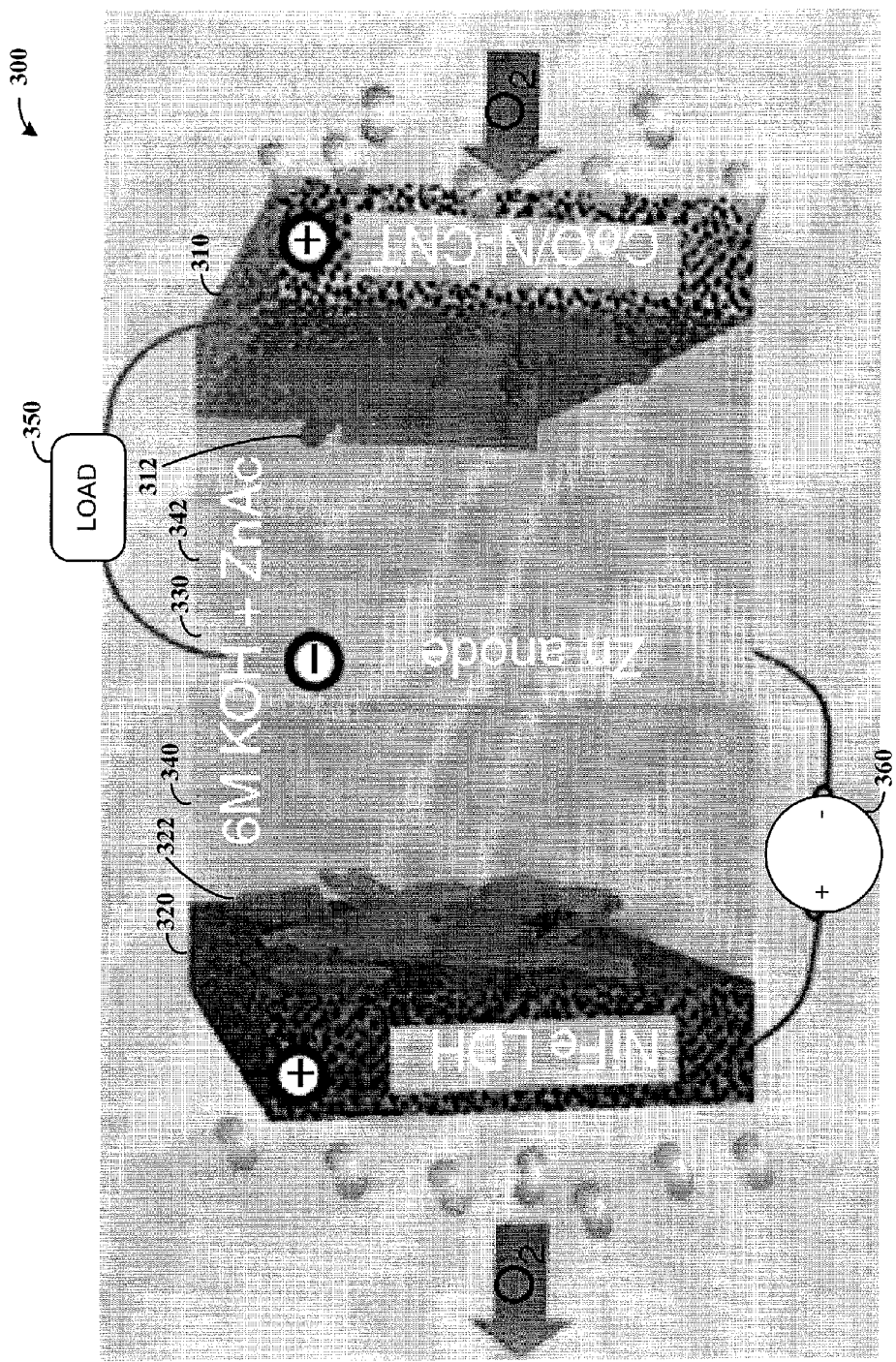
FIG. 3 shows another battery apparatus with electrode portions with respective catalysts for oxygen reduction and evolution, in accordance with another example embodiment.

FIG. 3 shows another battery apparatus 300, with electrode portions 310 and 320 having respective catalysts for oxygen reduction and evolution, in accordance with another example embodiment. The electrode portion 310 includes an ORR catalyst 312 having CoO/CNT material, and the electrode portion 320 includes an OER catalyst 322 having Ni—Fe LDH. An anode 330 (e.g., Zn) is located between the electrode portions 310 and 320 and separated therefrom by electrolytes 340 and 342. The battery apparatus 300 powers a load 350 that is coupled across the electrode portion 310 and anode 330 via an ORR reaction using a catalyst 312, which discharges the battery. For charging the battery apparatus 300, voltage source 360 is connected as shown and charges the battery apparatus 300 via application of a voltage across the electrode portion 320 and anode 330 using an OER reaction via the catalyst 322. Using such an approach, the electrode portion 310 can be isolated from the anode 330 for charging operation, which can prevent exposure of the electrode to positive potential. For instance, in some applications, the load 350 is operable to actively disconnect the electrode portion 310 when the electrode portion 320 is operable for storing charge. In some implementations, one or both electrode portions 310 and 320 includes a porous Ni foam operable as a current collector (e.g., with high loading of carbon-free Ni—Fe LDH nanoplates on Ni foam (5 mg cm$^{-2}$) for the electrode portion 320).

In one or more alternate embodiments, the tri-electrode approach shown in FIG. 3 is implemented with a single electrode having both hybrid catalysts 312 and 322 on a single electrode (cathode) base, and separated from the anode 330 by an electrolyte such as is shown. Both the load 350 and the voltage source 360 can be coupled across the anode/cathode base for discharge/use and for charging operation.

Based upon the above discussion and illustrations, those skilled in the art will readily recognize that various modifications and changes may be made to the various embodiments without strictly following the exemplary embodiments and applications illustrated and described herein. For example, various different types of current collectors may be implemented, such as described in the patent applications to which priority is claimed, as referenced above. In addition, electrode components such as current collectors as characterized as being carbon or nanocarbon may be implemented with other materials. Various battery-type applications may be implemented with other structures, such as capacitors or other electrodes as may or may not be used in batteries. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:
1. An apparatus comprising:
   a nanocarbon substrate including at least one of graphene and carbon nanotubes (CNTs); and
   a hybrid electrode including a cobalt oxide/carbon nanotube (CoO/CNT) catalyst and a Ni—Fe-layered double hydride (LDH) catalyst, the electrode being configured and arranged to facilitate transfer of charge carriers with the nanocarbon substrate.

2. The apparatus of claim 1, further including an anode configured and arranged with the hybrid electrode in a battery, the hybrid electrode being configured and arranged as a cathode having:
the CoO/CNT catalyst on a first cathode substrate and configured and arranged to power a load connected between the first cathode and anode, by catalyzing an oxygen reduction reaction (ORR) and discharging energy stored in the battery, and
the Ni—Fe-LDH catalyst on a second cathode substrate and configured and arranged to store charge in the battery via a power source, connected between the second cathode substrate and the anode, by catalyzing an oxygen evolution reaction (OER) and storing energy in the battery.

3. The apparatus of claim 2, wherein the first and second cathode substrates are separated from one another and the anode is between the first and second cathode substrates.

4. The apparatus of claim 1, wherein the hybrid electrode is configured and arranged with the nanocarbon substrate to provide battery discharging and charging by:
catalyzing an ORR via the CoO/CNT catalyst during discharge of stored energy from the battery; and
catalyzing an OER via the Ni—Fe-LDH during charging of the battery.

5. The apparatus of claim 1, wherein the hybrid electrode is configured and arranged with the nanocarbon substrate to provide battery discharging and charging by:
catalyzing an ORR during discharge of stored energy from the battery; and
catalyzing an OER during charging of the battery.

6. The apparatus of claim 1, wherein the hybrid electrode is configured and arranged with the nanocarbon substrate to:
discharge energy by catalyzing an ORR via the CoO/CNT catalyst; and
store energy by catalyzing an OER via the Ni—Fe-LDH.

7. The apparatus of claim 1, wherein the CoO/CNT catalyst includes CoO nanocrystals on N-doped CNTs.

8. The apparatus of claim 1, wherein the Ni—Fe-LDH catalyst includes stacked Ni—Fe-LDH nanoplates having a thickness of about 10 atomic layers.

9. The apparatus of claim 1, wherein the nanocarbon substrate includes carbon paper, and the CoO/CNT catalyst is on the carbon paper.

10. The apparatus of claim 1, wherein the nanocarbon substrate includes graphene and CNTs.

11. The apparatus of claim 1, wherein the nanocarbon substrate includes oxidized regions of the at least one of graphene and CNTs.

12. The apparatus of claim 1, wherein the respective electrodes are configured and arranged to facilitate transfer of charge carriers with the nanocarbon substrate via covalent bonds implemented with at least one of the CoO/CNT catalyst and the Ni—Fe-LDH catalyst.

13. The apparatus of claim 1, wherein the hybrid electrode includes a plurality of graphene sheets with nanocrystals thereupon being stacked in layers that form an electrochemical pseudo-capacitor electrode.

14. The apparatus of claim 1, further including a charge-passing material that is a separator configured and arranged to pass charge with the hybrid electrode.

15. A battery apparatus comprising:
an anode;
an electrolyte;
a first cathode having a first substrate and a hybrid cobalt oxide/carbon nanotube (CoO/CNT) catalyst configured and arranged with the anode and the electrolyte to facilitate an oxygen reduction reaction (ORR) for discharging stored energy; and
a second cathode having a second substrate and a hybrid Ni—Fe-layered double hydride (LDH) catalyst configured and arranged with the anode and the electrolyte to facilitate an oxygen evolution reaction (OER) for storing energy.

16. The battery apparatus of claim 15, wherein the first cathode is configured and arranged to power a load connected between the first cathode and the anode, further including a circuit configured and arranged to disconnect or interrupt a circuit path between the first cathode and the anode that passes via the load while the second cathode is operating to store the energy.

17. The battery apparatus of claim 15, wherein the first and second substrates are carbon-based substrates.

18. The battery apparatus of claim 15, wherein the anode is between the first and second cathodes and the electrolyte includes a first electrolyte portion between the first cathode and the anode, and a second electrolyte portion between the second cathode and the anode.

19. A method comprising:
storing energy by facilitating an oxygen evolution reaction (OER) using a first cathode having a substrate and a hybrid Ni—Fe-layered double hydride (LDH) catalyst, by passing charge carriers between the first cathode and an anode via an electrolyte; and
discharging the stored energy and powering a load by facilitating an oxygen reduction reaction (ORR) using a second cathode having a substrate and a hybrid cobalt oxide/carbon nanotube (CoO/CNT) catalyst, by passing charge carriers between the second cathode and the anode via an electrolyte.

20. The method of claim 19, further including, while storing the energy, electrically insulating the second cathode from the anode by disconnecting a circuit connection between the second cathode and the anode.

* * * * *

UNITED STATES PATENT AND TRADEMARK OFFICE
CERTIFICATE OF CORRECTION

| | | |
|---|---|---|
| PATENT NO. | : 9,362,568 B2 | Page 1 of 1 |
| APPLICATION NO. | : 14/336854 | |
| DATED | : June 7, 2016 | |
| INVENTOR(S) | : Dai | |

It is certified that error appears in the above-identified patent and that said Letters Patent is hereby corrected as shown below:

<u>In the Specification</u>

Col. 1, lines 7-10: "This invention was made with Government Support under contract N00014-08-1-0860 awarded by the Office of Naval Research. The Government has certain rights in this invention." should read --This invention was made with Government Support under contract DE-AC02-05CH11231 awarded by the Department of Energy and under contract N00014-08-1-0860 awarded by the Office of Naval Research. The Government has certain rights in this invention.--

Signed and Sealed this
Twenty-third Day of August, 2016

Michelle K. Lee
*Director of the United States Patent and Trademark Office*